(12) United States Patent  (10) Patent No.: US 7,742,104 B2
Kim  (45) Date of Patent: Jun. 22, 2010

(54) DISPLAY APPARATUS AND CONTROL METHOD THEREOF

(75) Inventor: Dae-gu Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1112 days.

(21) Appl. No.: 11/398,634

(22) Filed: Apr. 6, 2006

(65) Prior Publication Data

US 2006/0274202 A1  Dec. 7, 2006

(30) Foreign Application Priority Data

Jun. 7, 2005  (KR) .................... 10-2005-0048607

(51) Int. Cl.
  *H04N 3/27* (2006.01)
  *H04N 5/46* (2006.01)
(52) U.S. Cl. ...................................... 348/554; 348/558
(58) Field of Classification Search ......... 348/553–555, 348/557, 558, 725; *H04N 3/27, 5/46, 5/44*
  See application file for complete search history.

(56) References Cited

U.S. PATENT DOCUMENTS 6,108,044 A    8/2000  Shin
6,687,802 B1   2/2004  Kori et al.
7,075,585 B2*  7/2006  Favrat et al. ................. 348/554
2004/0233332 A1* 11/2004  Takashimizu et al. ........ 348/558

FOREIGN PATENT DOCUMENTS

| CN | 1199984 A | 11/1998 |
| CN | 1516160 A | 7/2004 |
| JP | 2000-188698 A | 7/2000 |
| KR | 1999-0042395 A | 6/1999 |
| KR | 1999-0056472 A | 7/1999 |
| KR | 10-2004-0013905 A | 2/2004 |
| KR | 10-2004-0061282 A | 7/2004 |

\* cited by examiner

*Primary Examiner*—Sherrie Hsia
(74) *Attorney, Agent, or Firm*—Sughrue Mion, PLLC

(57) ABSTRACT

A display apparatus and a control method thereof is provided in which channels corresponding to a predetermined broadcasting format are displayed on a display unit even though they are not separately selected by a user as desired channels. A display apparatus includes a display unit to display a picture thereon, and a tuner to select a channel, a broadcasting format selection unit to select a predetermined broadcasting format, a signal receiver to receive information about the broadcasting format, and a controller to control the tuner to allow the channel corresponding to the broadcasting format to be displayed on the display unit when the broadcasting format is selected through the broadcasting format selection unit.

9 Claims, 2 Drawing Sheets

DISPLAY APPARATUS AND CONTROL METHOD THEREOF

CROSS-REFERENCE TO RELATED APPLICATIONS

This application claims priority from Korean Patent Application No. 10-2005-0048607, filed on Jun. 7, 2005, in the Korean Intellectual Property Office, the disclosure of which is incorporated herein by reference.

BACKGROUND OF THE INVENTION

1. Field of the Invention

The present invention relates to a display apparatus and a control method thereof, and more particularly, to a display apparatus and a control method thereof, which can display a picture based on only channels corresponding to a predetermined broadcasting format on a display unit.

2. Description of the Related Art

Recently, as data broadcasting services have started, display apparatuses receive data as well as video signals. For example, a display apparatus has been widely used in receiving the data separately from the video signal as well as receiving both the data and the video signal at once.

Accordingly, technology has been developed that allows a user to easily select a desired channel or a desired program by checking information about the program or data associated with a picture the user is currently watching or by checking through a television.

However, in the conventional display apparatus, when a user wants to watch only channels associated with a predetermined broadcasting format, for example, when a user wants to watch only High Definition (HD) broadcasting channels, it is inconvenient for a user to have to previously store each channel associated with HD broadcasting as desired channels.

SUMMARY OF THE INVENTION

The present invention provides a display apparatus and a control method thereof, in which channels corresponding to a predetermined broadcasting format are displayed on a display unit even though they are not separately selected by a user as desired channels.

According to an aspect of the present invention, there is provided a display apparatus comprising a display unit to display a picture thereon; a tuner to select a channel; a broadcasting format selection unit to select a predetermined broadcasting format; a signal receiver to receive information about the broadcasting format; and a controller to control the tuner to allow the channel corresponding to the broadcasting format to be displayed on the display unit when the broadcasting format is selected through the broadcasting format selection unit.

According to an aspect of the present invention, the information about the broadcasting format is received while being included in a sequence header of a video signal included in a broadcasting signal, and the controller analyzes the sequence header and determines whether the channel corresponds to the broadcasting format.

According to an aspect of the present invention, the information about the broadcasting format is received while being included in Program and System Information Protocol (PSIP) data, and the controller determines whether the channel corresponds to the broadcasting format on the basis of the PSIP data.

According to an aspect of the present invention, the information about the broadcasting format includes information about whether broadcasting corresponding to the channel is of the HD broadcasting type.

According to an aspect of the present invention, the broadcasting format selection unit comprises a HD broadcasting channel up/down key for selecting only the channels corresponding to the HD broadcasting to be displayed on the display unit.

A method of controlling a display apparatus comprising providing a broadcasting format selection unit to select a predetermined broadcasting format; receiving information about the broadcasting format; receiving a selection signal for the broadcasting format from the broadcasting format selection unit; and controlling a tuner to allow a channel corresponding to the broadcasting format to be displayed on a display unit.

According to an aspect of the present invention, the method further comprises receiving the information about the broadcasting format while being included in a sequence header of a video signal included in a broadcasting signal; and determining whether the channel corresponds to the broadcasting format on the basis of the sequence header.

According to an aspect of the present invention, the method further comprises receiving the information about the broadcasting format while being included in a PSIP; and determining whether the channel corresponds to the broadcasting format on the basis of the PSIP.

According to an aspect of the present invention, the information about the broadcasting format includes information about whether the channel corresponds to HD broadcasting.

BRIEF DESCRIPTION OF THE DRAWINGS

The above and/or other aspects of the present invention will become more apparent by describing in detail the exemplary embodiments, with reference to the accompanying drawings, in which.

DETAILED DESCRIPTION OF EXEMPLARY EMBODIMENTS

Figure 1:
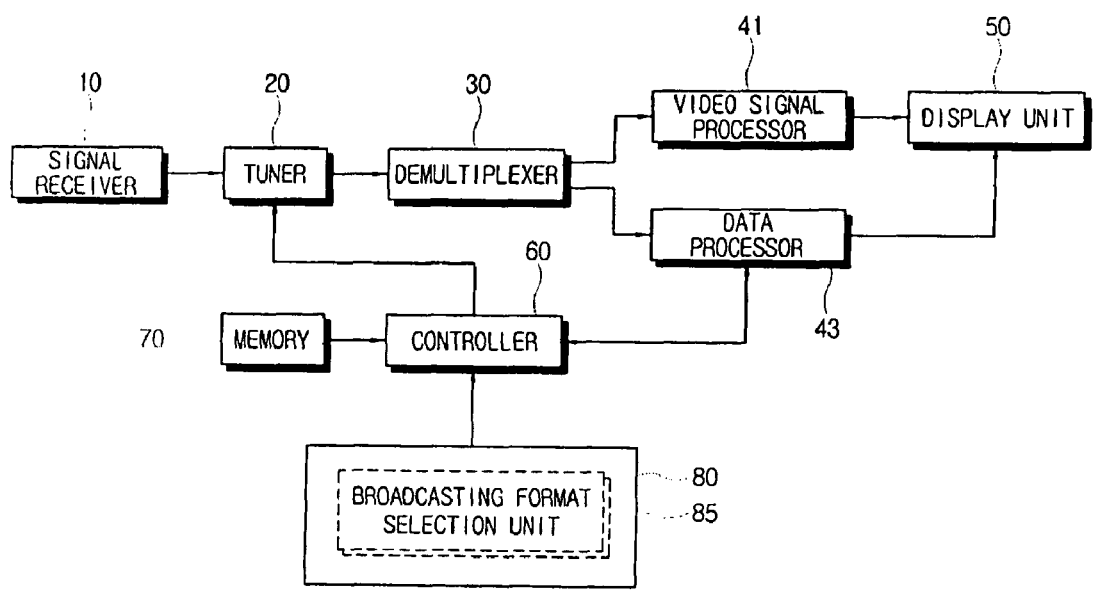
FIG. 1 is a control block diagram of a display apparatus according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

A display apparatus according to an exemplary embodiment of the present invention, as shown in FIG. 1, includes a signal receiver 10 to receive a digital broadcasting signal from a transmitting station; a tuner 20 to select the broadcasting signal received through the signal receiver 10; a display unit 50 to display a picture thereon; a broadcasting format selection unit 85 to select a predetermined broadcasting format; and a controller 60 to control the signal receiver 10, the tuner 20, the display unit 50, and the broadcasting selection unit 85. Here, the broadcasting selection unit 85 may be provided in a user selection unit 80.

Further, the display apparatus according to an exemplary embodiment of the present invention may include a demultiplexer 30, a video signal processor 41 to process a video signal, a data processor 43 to process data, and a memory 70 to store predetermined data.

The tuner 20 selects a broadcasting signal corresponding to a channel searched by the controller 60 among the broadcasting signals received through the signal receiver 10.

The demultiplexer 30 divides the broadcasting signal received from the tuner 20 into an audio signal, a video signal and data, and transmits the audio signal, the video signal and the data to an audio signal processor (not shown), the video signal processor 41, and the data processor 43, respectively.

Here, the data included in broadcasting signal corresponding to a channel currently selected at the tuner 20 includes PSIP data.

The video signal processor 41 converts the video signal transmitted from the demultiplexer 30 to have a format suitable for the display unit 50, and transmits the converted video signal to the display unit 50.

The display unit 50 according to an exemplary embodiment of the present invention displays a picture based on the video signal processed by the video signal processor 41. Meanwhile, the data processed by the data processor 43 can be displayed on the display unit 50. The display unit 50 includes a display module (not shown) to display a picture thereon, and a module driver (not shown) to process the video signal received from the video signal processor 41 and display a picture on the display module. Examples of the display module according to an exemplary embodiment of the present invention, include a digital light processing (DLP) device, a liquid crystal display (LCD), a plasma display panel (PDP), and the like.

Here, when the DLP is used as the display module, the module driver may include an optical engine. When the LCD is used as the display module, the module driver may include a printed circuit board (PCB) to convert a signal received from the video signal processor 41 into a data signal and a gate signal. Likewise, the module driver of the display unit 50 may include various configurations according to the display modules.

The user selection unit 80 can include a plurality of input keys, a plurality of buttons, and the like for allowing a user to select or input a predetermined function. For example, the user selection unit 80 can include a remote controller.

In the case that a remote controller is used as the user selection unit 80, the remote controller may include the broadcasting format selection unit 85 to select a predetermined broadcasting format, and a signal output unit (not shown) to output a selection signal indicating that a predetermined broadcasting format is selected. The broadcasting format may indicate whether a picture corresponding to each of channels has a HD broadcasting format. Below, the broadcasting format for HD broadcasting will be described by way of an example.

In this case, only HD broadcasting is selected by selection of the broadcasting format selection unit 85, and then displayed on the display unit 50. After HD broadcasting is selected through the broadcasting format selection unit 85, only HD broadcasting can be displayed on the display unit 50 while the channels are tuned using a predetermined channel search key such as an existing channel up/down key and a separated channel up/down key, or the broadcasting format selection unit 85.

When an event information table (EIT) in the PSIP includes information about a broadcasting format, the controller 60 analyzes the PSIP processed from the data processor 43 and determines whether the information indicates that the video signal is of the HD broadcasting type.

The controller 60 controls the tuner 20 to display only channels corresponding to HD broadcasting when HD broadcasting is selected through the broadcasting format section unit 85.

According to a first exemplary embodiment of the present invention, the controller 60 can analyze a sequence header of the video signal so as to determine channel information about whether the broadcasting corresponding to a predetermined channel is of the HD broadcasting type.

In the case where the display apparatus according to an exemplary embodiment of the present invention includes a plurality of tuners 20, the controller 60 controls the display unit 50 to display a picture based on the video signal received through one tuner 20, determines whether each of the video signals corresponding to channels received through other tuners 20 is of the HD broadcasting type, and then stores a determination result in the memory 70.

Thus, when a user wants to watch only HD broadcasting, the controller 60 controls the display unit 50 to display a picture based on channels corresponding to the HD broadcasting stored in the memory 70.

On the other hand, in the case that the display apparatus includes one tuner 20, the controller 60 determines whether the broadcasting corresponding to the channel selected by the tuner 20 is of the HD broadcasting type. The controller 60 then determines whether only the broadcasting corresponding to the channel selected by the tuner 20 is of the HD broadcasting type. Therefore, when the channel up/down key is selected through the user selection unit 80 for selecting the next HD broadcasting channel, the controller 60 checks all channels one by one and controls the display unit 50 to display the next HD broadcasting channel.

According to a second exemplary embodiment of the present invention, it will be supposed by way of example that the EIT in the PSIP includes information about the broadcasting format corresponding to a predetermined channel. In this case, the controller 60 analyzes the EIT to determine whether the broadcasting corresponding to a predetermined channel is of the HD broadcasting type, and stores a determination result in the memory 70.

When the EIT including the information about a predetermined broadcasting format is included in the data of the broadcasting signal, the controller 60 analyzes the data included in the broadcasting signal and determines whether the broadcasting corresponding to the channel selected by the tuner 20 is of the HD broadcasting type.

The controller 60 can then determine whether only the broadcasting corresponding to the channel selected by the tuner 20 is of the HD broadcasting type. Therefore, when the channel up/down key is selected through the user selection unit 80 for selecting the next HD broadcasting channel, the controller 60 checks all channels one by one, and then controls the display unit 50 to display the channel corresponding to the next HD broadcasting channel.

Further, in the case where the display apparatus according to an exemplary embodiment of the present invention includes a plurality of tuners 20, the controller 60 controls the display unit 50 to display a picture based on the channel selected through one tuner 20, and determines whether the broadcasting corresponding to each of channels received through other tuners 20 is of the HD broadcasting type, and then stores the HD broadcasting channels in the memory 70. Also, when HD broadcasting is selected through the broadcasting format selection unit 85, the controller 60 controls the tuner 20 to allow the channels stored in the memory 70 to be displayed on the display unit 50.

Here, the EIT including the information about a predetermined broadcasting format may be received while being included in an electronic program guide (EPG).

Figure 2:
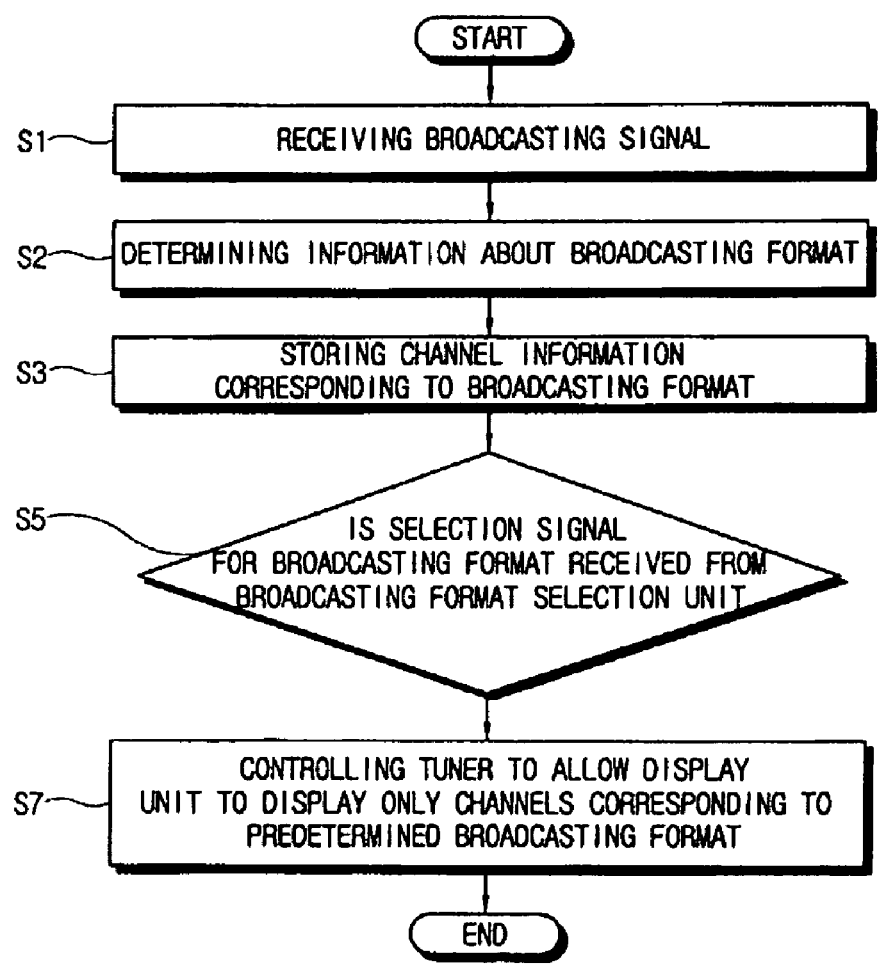
FIG. 2 is a control flowchart of the display apparatus according to an exemplary embodiment of the present invention.

FIG. 2 is a control flowchart of the display apparatus according to an exemplary embodiment of the present invention.

As shown in FIG. 2, the display apparatus according to an exemplary embodiment of the present invention receives the broadcasting signal through the signal receiver 10 at operation S1. Then, the controller 60 determines the information about the broadcasting format at operation S2, and controls the memory 70 to store the channel information corresponding to a predetermined broadcasting format on the basis of the determination result at operation S3.

When the controller 60 receives the selection signal from the broadcasting format selection unit 85 of the user selection unit 80 at operation S5, the controller 60 controls the tuner 20 at operation S7, thereby allowing the display unit 50 to display a picture based on only the channel corresponding to the broadcasting format on the basis of the channel information stored in the memory 70.

In the case that the display apparatus includes only one tuner 20, the operation S2 is preferably, but not necessarily, implemented after the operation S5.

According to the first exemplary embodiment of the present invention, the controller 60 can determine the broadcasting format by analyzing the sequence header of the video signal in the operation S2.

According to the second exemplary embodiment of the present invention, the controller 60 can determine the broadcasting format of the video signal by analyzing the PSIP included in the data of the broadcasting signal in the operation S2.

Thus, the display apparatus according to an exemplary embodiment of the present invention allows a user to watch only the channel corresponding to a predetermined broadcasting format without separate manipulation. In particular, as HD broadcasting, standard definition (SD) broadcasting, and general broadcasting have recently been used in the display apparatus together, a user can select and watch only the HD broadcasting without separately storing the channels.

Therefore, the display apparatus according to an exemplary embodiment of the present invention solves the conventional inconvenience where a user would have to control an on screen display (OSD) for setting the desired channels to be displayed on the display unit, and then manually set each channel through the OSD.

Further, conventional techniques typically are such that one channel frequently alternate between HD broadcasting and other broadcasting types according to time schedules. In this case, the display apparatus according to an exemplary embodiment of the present invention prevents a user from having to select, store and search for HD broadcasting channels one by one.

As described above, the present invention provides a display apparatus and a control method thereof, which receives information about a predetermined broadcasting format and displays only channels corresponding to a broadcasting signal having a predetermined broadcasting format on a display unit.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display unit;
   a tuner;
   a broadcasting format selection unit which selects a broadcasting format;
   a signal receiver which receives a broadcasting signal; and
   a controller which controls the tuner, based on information in the broadcasting signal, to select a channel of the broadcasting signal corresponding to the broadcasting format selected through the broadcasting format selection unit so that the channel is displayed on the display unit.

2. The display apparatus according to claim 1, wherein the information is information about the broadcasting format included in a sequence header of a video signal included in the broadcasting signal, and the controller analyzes the sequence header and determines whether the channel corresponds to the broadcasting format.

3. The display apparatus according to claim 1, wherein the information is information about the broadcasting format which is included in Program and System Information Protocol data, and
   the controller determines whether the channel corresponds to the broadcasting format on the basis of the Program and System Information Protocol data.

4. The display apparatus according to claim 1, wherein the information is information about the broadcasting format and indicates whether the broadcasting corresponding to the channel is High Definition.

5. The display apparatus according to claim 4, wherein the broadcasting format selection unit comprises an High Definition broadcasting channel up or down key for selecting only the channels corresponding to the High Definition broadcasting to be displayed on the display unit.

6. A method of controlling a display apparatus comprising:
   receiving a broadcasting signal comprising information of a broadcasting format;
   selecting the broadcasting format; and
   controlling a tuner, based on information in the broadcasting signal, to select a channel corresponding to the broadcasting format which is selected so that the channel is displayed on a display unit.

7. The method according to claim 6, wherein the information is information about the broadcasting format which is included in a sequence header of a video signal included in the broadcasting signal, and
   wherein the method further comprises determining whether the channel corresponds to the broadcasting format on the basis of the sequence header.

8. The method according to claim 6, wherein the information is information about the broadcasting format which is included in Program and System Information Protocol data; and
   wherein the method further comprises determining whether the channel corresponds to the broadcasting format on the basis of the Program and System Information Protocol data.

9. The method according to claim 6, wherein the information is information about the broadcasting format and indicates whether the channel corresponds to High Definition broadcasting.

* * * * *